United States Patent
Mihara et al.

(10) Patent No.: US 10,399,856 B2
(45) Date of Patent: Sep. 3, 2019

(54) PARTICULATE POROUS CARBON MATERIAL, PARTICULATE CARBON MATERIAL AGGREGATE, AND PRODUCTION METHOD FOR PARTICULATE POROUS CARBON MATERIAL

(71) Applicant: TORAY INDUSTRIES, INC., Tokyo (JP)

(72) Inventors: Takaaki Mihara, Otsu (JP); Kentaro Tanaka, Otsu (JP); Kosaku Takeuchi, Otsu (JP); Tomoyuki Horiguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 129 days.

(21) Appl. No.: 15/511,994

(22) PCT Filed: Aug. 31, 2015

(86) PCT No.: PCT/JP2015/074651
§ 371 (c)(1),
(2) Date: Mar. 16, 2017

(87) PCT Pub. No.: WO2016/043030
PCT Pub. Date: Mar. 24, 2016

(65) Prior Publication Data
US 2017/0291820 A1   Oct. 12, 2017

(30) Foreign Application Priority Data
Sep. 18, 2014 (JP) .................................. 2014-189652

(51) Int. Cl.
C01B 32/366 (2017.01)
D01F 9/22 (2006.01)
(Continued)

(52) U.S. Cl.
CPC ............ *C01B 32/366* (2017.08); *C01B 32/05* (2017.08); *C01B 32/382* (2017.08); *D01F 9/22* (2013.01);
(Continued)

(58) Field of Classification Search
CPC ..... C01B 32/366; C01B 32/382; C01B 32/05; D01F 9/22; C01P 2006/16; C01P 2004/61;
(Continued)

(56) References Cited

U.S. PATENT DOCUMENTS 7,122,132 B2   10/2006 Morita et al.
8,632,885 B2   1/2014 Kondo
(Continued)

FOREIGN PATENT DOCUMENTS

CN   1404907 A   3/2003
JP   H03098624 A   4/1991
(Continued)

OTHER PUBLICATIONS

International Search Report and Written Opinion for International Application No. PCT/JP2015/074651, dated Oct. 20, 2015 6 Pages.
(Continued)

*Primary Examiner* — Richard M Rump
(74) *Attorney, Agent, or Firm* — RatnerPrestia

(57) ABSTRACT

The present invention relates to a particulate porous carbon material having a continuous porous structure, the particulate porous carbon material satisfying the following A to C: A: branch portions forming the continuous porous structure have an aspect ratio of 3 or higher; B: the branch portions have aggregated through joints interposed therebetween, the number of the aggregated branch portions (N) being 3 or
(Continued)

larger; C: a ratio of the number of the aggregated branch portions (N) to the number of the joints (n), N/n, is 1.2 or larger.

16 Claims, 1 Drawing Sheet

(51) Int. Cl.
 *C01B 32/05* (2017.01)
 *C01B 32/354* (2017.01)
(52) U.S. Cl.
 CPC ...... *C01P 2004/54* (2013.01); *C01P 2004/61* (2013.01); *C01P 2004/62* (2013.01); *C01P 2004/64* (2013.01); *C01P 2006/16* (2013.01)
(58) Field of Classification Search
 CPC .............. C01P 2004/62; C01P 2004/64; C01P 2004/54
 See application file for complete search history.

(56) References Cited

U.S. PATENT DOCUMENTS

| | | |
|---|---|---|
| 9,085,831 B2 | 7/2015 | Kondo |
| 2004/0036060 A1 | 2/2004 | Morita et al. |
| 2008/0131352 A1 | 6/2008 | Kondo |
| 2010/0272978 A1 | 10/2010 | Kumar et al. |
| 2012/0040523 A1 | 2/2012 | Kondo |
| 2016/0046491 A1 | 2/2016 | Mihara et al. |
| 2016/0362541 A1 | 12/2016 | Mihara et al. |

FOREIGN PATENT DOCUMENTS

| | | | |
|---|---|---|---|
| JP | 2002266170 A | | 9/2002 |
| JP | 2003336130 A | | 11/2003 |
| JP | 2004026954 A | | 1/2004 |
| JP | 2004036058 A | | 2/2004 |
| JP | 2006176899 A | | 7/2006 |
| JP | 2008137846 A | | 6/2008 |
| JP | 2011500978 A | | 1/2011 |
| JP | 2011228086 A | * | 11/2011 |
| JP | 2011228086 A | | 11/2011 |
| WO | 2006100783 A1 | | 9/2006 |
| WO | 2015129488 A1 | | 9/2015 |
| WO | 2014148303 A1 | | 6/2017 |

OTHER PUBLICATIONS

Zhang et al., "PVA-based Activated Carbon Fibers with Lotus Root-like Axially Porous Structure", Carbon, 2006, vol. 44, pp. 2059-2068.

Extended European Search Report for European Application No. 15 842 693.2, dated Feb. 23, 2018, 12 pages.

* cited by examiner

PARTICULATE POROUS CARBON MATERIAL, PARTICULATE CARBON MATERIAL AGGREGATE, AND PRODUCTION METHOD FOR PARTICULATE POROUS CARBON MATERIAL

CROSS REFERENCE TO RELATED APPLICATIONS

This is the U.S. National Phase application of PCT International Application No. PCT/JP2015/074651, filed Aug. 31, 2015, and claims priority to Japanese Patent Application No. 2014-189652, filed Sep. 18, 2014, the disclosures of each of these applications being incorporated herein by reference in their entireties for all purposes.

FIELD OF THE INVENTION

The present invention relates to a particulate porous carbon material which can be widely used in various applications, a particulate carbon material assembly including the particulate porous carbon material, and a process for producing the particulate porous carbon material.

BACKGROUND OF THE INVENTION

Known as particulate porous carbon materials are activated carbon having both relatively large macropores and micropores, including granular activated carbon and activated-carbon fibers, and fine carbons represented by carbon nanotubes, meso-porous carbon produced from meso-porous silica or zeolite templates, etc.

These particulate porous carbon materials have not only the high chemical stability, electrical conductivity, and thermal conductivity which are possessed by the carbon but also large surface areas due to the pores. Owing to such properties, these carbon materials have been utilized as battery materials, adsorbent materials, catalyst supports, etc.

In particular, carbon materials produced from carbon nanotubes are attracting attention because of the high electrical conductivity and thermal conductivity thereof, and attempts are being made to create a functional material so as to take advantage of these properties. For example, Patent Document 1 describes a vapor-phase-process carbon fiber (carbon nanotube) having a branch portion. Patent Document 2 describes a bundle of carbon nanotubes, in which the ends on one side have been connected to each other by a carbon network.

PATENT DOCUMENT

Patent Document 1: JP-A-2002-266170
Patent Document 2: JP-A-2008-137846

SUMMARY OF THE INVENTION

Carbon nanotubes merely having branch portions, such as that described in Patent Document 1, have had a drawback in that the carbon nanotubes are densified by pressing in, for example, press forming, resulting in a decrease in substance permeability. In addition, since the amount of the branch portions is small and the amount and frequency of chemically bonded carbon networks are insufficient, it has been difficult to attain a high level of electrical conductivity and thermal conductivity. Meanwhile, in the case of the bundle of carbon nanotubes described in Patent Document 2, since the ends on one side only have been connected to each other by a carbon network, it is difficult for the carbon nanotubes to retain mechanical strength for withstanding separation, etc., and there has been a tendency that the carbon network is readily destroyed upon reception of force during pulverization or classification to bring the bundle into separate fibers. Furthermore, there has been a tendency that such bundles are readily densified by compressive force, resulting in impaired substance permeability.

An object of the present invention is to provide a particulate porous carbon material which is excellent in terms of electrical conductivity, thermal conductivity, pressure resistance, tensile strength, and compressive strength.

In order to solve the above-mentioned problem, the present invention relates to a particulate porous carbon material having a continuous porous structure, the particulate porous carbon material satisfying the following A to C:

A: branch portions forming the continuous porous structure have an aspect ratio of 3 or higher;
B: the branch portions have aggregated through joints interposed therebetween, the number of the aggregated branch portions (N) being 3 or larger;
C: a ratio of the number of the aggregated branch portions (N) to the number of the joints (n), N/n, is 1.2 or larger.

Since the particulate porous carbon material of the present invention has a structure in which branch portions having a high aspect ratio have aggregated through connecting portions, this carbon material is high in electrical conductivity and thermal conductivity. In addition, since there is an effect in which the branch portions in the continuous porous structure mutually support the structure, the particulate porous carbon material highly withstands deformations due to tension, compression, etc. Consequently, the particulate porous carbon material of the present invention is usable in various applications including applications where electron transfers are important, such as electrical and electronic materials, and materials which perform heat exchange, such as heat dissipation materials.

DETAILED DESCRIPTION OF EMBODIMENTS OF THE INVENTION

<Particulate Porous Carbon Material>

Figure 1:
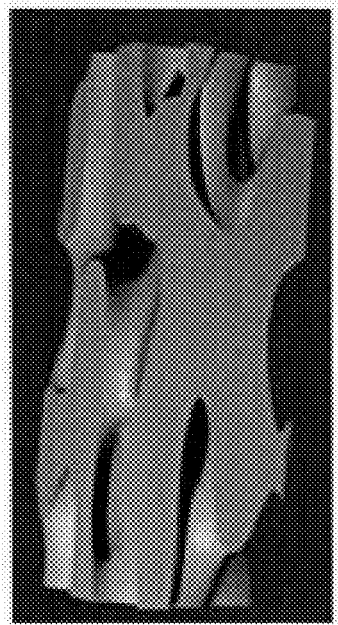
FIG. 1 is a schematic view of the continuous porous structure of a particulate porous carbon material of the present invention.
Figure 2:
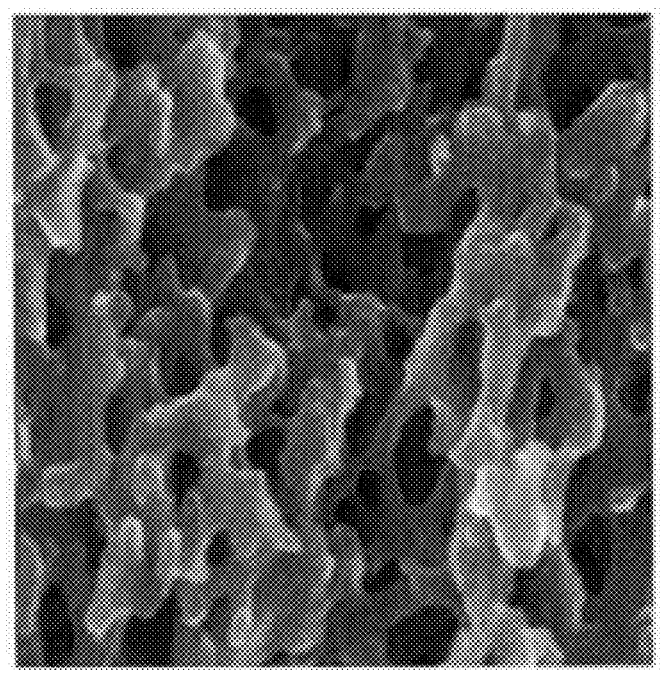
FIG. 2 is a scanning electron photomicrograph of the continuous porous structure of the particulate porous carbon material of the present invention produced in Example 1.

The particulate porous carbon material (hereinafter sometimes referred to simply as "material") of the present invention has a continuous porous structure. The term "continuous porous structure" means that in cases when either a cross-section obtained by breaking, with tweezers or the like, a specimen sufficiently cooled in, for example, liquid nitrogen or a particulate specimen as such is placed on a specimen stage and the surface thereof is examined with a scanning electron microscope (SEM) or the like, then a structure is observed in which branch portions (carbon portions) and pores (voids) are intertwined with each other as shown by the schematic view of FIG. 1 and the photograph of FIG. 2. There can be cases where in some of small ones of particulate porous carbon materials of the present invention, there are only a few branch points by a void formed between branch portions. In this description, the void in such cases is also referred to as a pore and this material is regarded as having a continuous porous structure.

In the particulate porous carbon material of the present invention, the branch portions forming the continuous porous structure have an aspect ratio of 3 or higher. In the continuous porous structure, the carbon portions have connected to each other through joints to form a network structure, and the term "branch portion" means either the region ranging from one joint of the carbon portions constituting the network structure to an adjacent joint (another joint) or the region of a carbon portion which extends from one joint of the carbon portions constituting the network structure to the end thereof. The aspect ratio of the branch portions is a value expressed by a ratio between L and D (L/D), where D is the minimum value of the diameter of the carbon portion in that region, i.e., the branch portion (hereinafter referred to as "minimum diameter of the branch portion"), and L is the actual distance of the region (hereinafter referred to as "length of the branch portion"). In this description, ten branch portions are examined for L/D, and the term "aspect ratio of the branch portions" means an average of the ten values. With respect to a particulate porous carbon material in which the number of aggregated branch portions is less than 10, aspect ratios are calculated with respect to all the branch portions and an average thereof is determined. Since the particulate porous carbon material has branch portions having a high aspect ratio, this carbon material can be made to have higher electrical conductivity and higher thermal conductivity. Although there is no particular upper limit on the aspect ratio of the branch portions, too long branch portions render the carbon material less apt to show isotropic mechanical properties. Consequently, the aspect ratio thereof is preferably 20 or less, more preferably 15 or less.

The length of a branch portion and the minimum diameter of the branch portion can be determined by photographing the particulate porous carbon material using a transmission electron microscope, X-ray microscope, or the like to obtain a transmission image, reconstructing the image using CT to obtain a three-dimensional image, and subjecting the three-dimensional image to axis thinning. The axis thinning can be performed using a commercial software, for example, Amira, manufactured by FEI Co., or the like. The length of a branch portion is the actual distance from the joint at one end of each line obtained by the axis thinning (i.e., from a branch point of each line) to the joint at the other end. The term "actual distance" as used herein, even in the case where the line itself has bent portions, means the length measured along the route. Specifically, in cases when a minute distance dx and a route from one joint to another joint on a line are set, the term "actual distance" means the total value of dx's in the route. Meanwhile, the minimum diameter of a branch portion is determined in the following manner. From a position X on the line of a branch portion obtained from the three-dimensional image by axis thinning, a perpendicular is drawn to the surface of this branch portion. When the length of this perpendicular is expressed by R(X) as a function of the position X on the line, then the minimum diameter D is determined using $D=2R_{min}$ from the minimum value $R_{min}$ of the R(X) for the range between the joint on one end of the line and the joint on the other end. Although at a position X on the line, a perpendicular can be drawn in any direction within the 360° range on the plane perpendicular to the line, an average value obtained by integrating the dimension of the perpendicular which has been drawn from the position X and which lies on the plane perpendicular to the line, at intervals of 10°/step, and dividing the integrated value by the number of integrations is taken as the R(X).

The particulate porous carbon material of the present invention has a structure in which branch portions have aggregated through joints interposed therebetween, the number of the aggregated branch portions (N) being 3 or larger. The number of aggregated branch portions (N) can be counted on the three-dimensional image of the particulate porous carbon material obtained by the axis thinning described above. Since this carbon material has the structure in which three or more branch portions have aggregated, other elements or molecules can be held in or can permeate into the pores surrounded by the branch portions. It is hence possible to accelerate reactions between the carbon and other elements or molecules at the interfaces. These functions are properties especially suitable for battery materials and catalyst supports. In addition, the branch portions have the effect of dispersing external force received by the particulate porous carbon material and, hence, the continuous porous structure is apt to be maintained during pulverization or classification. Furthermore, the voids surrounded by the branch portions are apt to be maintained, and other elements or molecules are apt to be held therein. It is hence possible to improve reactivity at the interfaces between the carbon material and the voids. The number of aggregated branch portions (N) is preferably 10 or larger, more preferably 20 or larger. There is no particular upper limit on the number of aggregated branch portions, and the number thereof can be suitably regulated in accordance with applications, for example, by changing the structural period, which will be described later, or the degree of pulverization. The smaller the number of aggregated branch portions, the more the substance permeation into the continuous porous structure is advantageous. In the case of applications accompanied with substance permeation, the number of aggregated branch portions is preferably up to 10,000.

In the particulate porous carbon material of the present invention, the ratio of the number of aggregated branch portions (N) to the number of joints (n), N/n, is 1.2 or larger. The number of joints n also can be counted on the three-dimensional image of the particulate porous carbon material obtained by the axis thinning described above.

Since the value of N/n is 1.2 or larger, the electrons and heat which have generated on the surface of the branch portions as a result of adsorption, desorption, and chemical reactions can be transmitted at higher efficiency to other substances through the branch portions. Furthermore, the trouble that branch portions only are broken during pulverization or classification can be avoided, and it is possible to highly efficiently maintain the continuous porous structure, which can be utilized for substance permeation and holding. The larger the number of joints, the far higher the efficiency at which the electrons and heat which have generated on the surface of the branch portions as a result of adsorption and chemical reactions are transmitted to other substances through the branch portions. It is hence preferable that the number of joints should be larger. Consequently, the value of N/n is preferably 1.5 or larger, more preferably 1.8 or larger, even more preferably 3.0 or larger.

Especially in the case of application to battery materials, in cases when the value of N/n is 1.2 or larger, the probability that each branch portion is in contact with another branch portion increases greatly and electron transfers to other branch portions via branch points occur smoothly. It is hence possible to remarkably lower the resistance value.

It is preferable that the structural period of the continuous porous structure is 0.002 µm-10 µm. The structural period of a continuous porous structure is determined by causing X-rays to strike on a specimen to determine a scattering angle 2θ at which the scattered-ray intensity has a peak value and calculating the structural period from the scattering angle 2θ using the following equation. In the case where the structural period exceeds 1 μm and a scattered-X-ray peak cannot be observed, a portion of the continuous porous structure of the particulate porous carbon material is three-dimensionally photographed by the X-ray CT method and the resultant image is subjected to Fourier transformation to obtain a spectrum, from which the structural period is calculated in the same manner. The spectrum in the present invention is data which are obtained by Fourier transformation from an image obtained by the X-ray scattering method or X-ray CT method and which show a relationship between one-dimensional scattering angle and scattered-ray intensity.

$$L = \frac{\lambda}{2 \sin \theta} \quad \text{[Math. 1]}$$

Structural Period: L
λ: Wavelength of Incident X-Rays

So long as the material has a structural period of 0.002 μm or longer, this material not only can be easily composited with other materials but also can exhibit excellent separating properties when used, for example, as a separation column material. Such structural periods are hence preferred. Meanwhile, so long as the material has a structural period of 10 μm or less, not only this material as a structural body has few defects and can be a mechanically excellent material but also a sufficiently large surface area can be ensured. This material hence is especially suitable for applications where reactions occurring on the surface are important. A value of the structural period can be selected at will within the above-described range in accordance with applications.

Since the particulate porous carbon material of the present invention has branch portions having a high aspect ratio, there are cases where the value of structural period varies depending on the X-ray incidence direction or X-ray CT photographing direction. It is preferable that the particulate porous carbon material of the present invention has a structural period within the above-described range when examined from any direction. In cases when an even porous structure is observed when the carbon material is examined from any direction, not only other elements or molecules can be held in or can permeate into the continuous porous structure, but also electrical conductivity and thermal conductivity through the branch portions and joints can be ensured.

The shorter the structural period, the finer the structure and the larger the surface area per unit volume or unit weight. For example, in the case of use for supporting a catalyst, the efficiency of contact between the catalyst and a fluid is greatly heightened thereby. Meanwhile, the longer the structural period, the lower the pressure loss and the more a fluid can be packed and/or passed. In view of these, it is preferred to set the structural period at will in accordance with intended applications.

It is preferable that the average porosity of the continuous porous structure is 10-80%. The average porosity is determined by acquiring a precisely formed cross-section from an embedded specimen by a cross-section polisher method (CP method) or focused ion beam method (FIB method), examining the cross-section at a magnification regulated so as to result in 1±0.1 (nm/pixel) and at a resolution of 700,000 pixels or higher to obtain an image, setting, on the image, an observation region which is necessary for calculation and has a size of 512-pixel square, and calculating the average porosity using the following equation, in which A is the area of the whole observation region and B is the area of the pores.

Average porosity (%)=$B/A \times 100$

The higher the average porosity, the more the efficiency of packing can be heightened when the carbon material is composited with other materials and the lower the pressure loss when the continuous porous structure is used as a channel for a gas or liquid, making it possible to heighten the flow rate. Meanwhile, the lower the average porosity, the more the resistance to compression or bending and the mechanical properties can be improved. Lower average porosities are hence advantageous from the standpoints of handleability and use under pressure. In view of these, the average porosity of the continuous porous structure is preferably in the range of 15-75%, more preferably in the range of 18-70%.

It is preferable that the continuous porous structure gives a pore diameter distribution curve which has at least one peak diameter in the range of 5 nm to 4 μm. The pore diameter distribution is determined by the mercury intrusion method or the gas adsorption method. In the mercury intrusion method, pore diameter distribution curves for a wide range of pores from 5 nm to 500 μm can be acquired. The mercury intrusion method is hence suitable for acquiring pore diameter distributions of materials having a long structural period. In contrast, the gas adsorption method is suitable for acquiring pore diameter distributions for pores in a region up to about 100 nm, which are small as compared with those in the mercury intrusion method. When determining a pore diameter distribution, either the mercury intrusion method or the gas adsorption method can be suitably selected in accordance with the structural period of the particulate porous carbon material of the present invention. The smaller the value of peak diameter in the pore diameter distribution curve, the shorter the distance between the particulate porous carbon material and another material composited therewith. In particular, in regions not larger than several tens of nanometers, the composite is apt to be in such a state that current is apt to flow between the particulate porous carbon material of the present invention and the other material because of quantum tunnel effect. Meanwhile, the larger the value of peak diameter, the more the particulate porous carbon material is easily composited with particles or the like having a large diameter. In view of these, the peak diameter of the pore diameter distribution curve of the particulate porous carbon material of the present invention is preferably in the range of 5 nm to 3 μm, more preferably in the range of 5 nm to 1 μm.

Even in the case where the particulate porous carbon material partly has portions having substantially no continuous porous structure, the pore diameter distribution of the continuously porous structure can be determined by determining the pore diameter distribution of the whole material, and a pore diameter distribution curve of the continuous porous structure can be regarded as approximate to a pore diameter distribution curve of the whole material.

The particulate porous carbon material of the present invention may partly have portions having substantially no continuous porous structure. The term "portion having substantially no continuous porous structure" means that when a cross-section allowed to be formed by a cross-section polisher method (CP method) is examined at a magnification of 1±0.1 (nm/pixel), a portion in which pores are not clearly observed because the pore diameters are smaller than the resolution is present with an area beyond a square region, each side of which corresponds to 3 times a structural period L calculated from X-ray described above.

The portions having substantially no continuous porous structure are portions in which carbon has been densely packed and which hence have higher electronic conductivity as compared with the portion having a continuous porous structure. The portions having substantially no continuous porous structure thus enable the electrical conductivity and the thermal conductivity to be maintained on or above a certain level. Consequently, the particulate porous carbon material having portions having substantially no continuous porous structure, when used, for example, as a battery material, can speedily remove the heat of reaction from the system and can reduce resistance concerning electron transfers, thereby contributing to production of high-efficiency batteries. There also is an advantage in that resistance to, in particular, compressive fracture can be remarkably heightened. Furthermore, when a fluid flows through the inside of the particle, the fluid passes by the portions having no continuous porous structure and, hence, the channels are jumbled together, making it possible to efficiently mix the fluid. Consequently, a property which renders the carbon material especially suitable as a separation-column packing material can be imparted.

The proportion of the portions having no continuous porous structure is not particularly limited, and can be regulated at will in accordance with applications. In the case of use as a battery material, it is preferable that the carbon material is one in which at least 5% by volume is accounted for by the portions having no continuous porous structure, because the electrical conductivity and thermal conductivity thereof can be maintained on a high level.

It is preferable that the proportion of the portions having no continuous porous structure in the particulate porous carbon material is 5% by volume or higher, from the standpoint that the carbon material exhibits the above-described property. The proportion of the portions having no continuous porous structure can be determined by a conventionally known analytical technique. It is, however, preferred to determine the proportion thereof by examining the carbon material by an electron-beam tomographic method, X-ray micro CT method, or the like to obtain a three-dimensional shape and calculating the proportion from the volumes of the portion having a continuous porous structure and of the portions having no continuous porous structure.

The term "particulate" in the present invention means that the particle has an equivalent circular particle diameter, as obtained with a scanning electron microscope, of 10 mm or less. The particle diameter of the particulate porous carbon material of the present invention is not particularly limited so long as the diameter is 10 mm or less, and can be suitably selected by changing the degree of pulverization in accordance with applications. Particles having a particle diameter of 10 nm to 10 μm, when used, for example, as a solid ingredient for paste formation, give an exceedingly smooth paste and can hence prevent defects such as paste separation, cracks, etc. from occurring in steps including coating. Meanwhile, particles having a particle diameter of 0.1 μm or larger, when used to produce a composite material with a resin, can sufficiently exhibit a strength-improving effect as a filler. Such particles hence are a preferred embodiment.

In general, particulate carbon materials are used as an assembly of a large number of such particulate carbon materials. In this case, the whole assembly need not be particulate porous carbon materials of the present invention, and inclusion of particulate porous carbon materials of the present invention as some of the assembly suffices. The content of the particulate porous carbon materials of the present invention in the assembly of particulate carbon materials is preferably 30% by weight or higher, more preferably 50% by weight or higher, even more preferably 70% by weight or higher, especially preferably 90% by weight or higher.

<Process for Producing the Particulate Porous Carbon Material>

The particulate porous carbon material of the present invention can be produced, for example, by a production process which includes a step in which a carbonizable resin and an eliminable resin are brought into a compatibly mixed state to obtain a resin mixture (step 1), a step in which the resin mixture in the compatibly mixed state is caused to undergo phase separation and the separated phases are fixed (step 2), a step of stretching (step 3), a step of performing carbonization by pyrolysis (step 4), and a step of performing pulverization (step 5).

[Step 1]

Step 1 is a step in which 10-90% by weight of a carbonizable resin and 90-10% by weight of an eliminable resin are brought into a compatibly mixed state to obtain a resin mixture.

Here, the carbonizable resin is a resin which carbonizes upon pyrolysis to remain as a carbon material, and either a thermoplastic resin or a thermosetting resin can be used. In the case of a thermoplastic resin, it is preferred to select a resin which can be subjected to an infusibilizing treatment by a simple process, such as heating or irradiation with a high-energy ray. In the case of a thermosetting resin, there are many cases where an infusibilizing treatment is unnecessary. Thermosetting resins also are hence included in suitable materials. Examples of the thermoplastic resin include poly(phenylene oxide), poly(vinyl alcohol), polyacrylonitrile, phenolic resins, and wholly aromatic polyesters. Examples of the thermosetting resin include unsaturated polyester resins, alkyd resins, melamine resins, urea resins, polyimide resins, diallyl phthalate resins, lignin resins, and urethane resins. These resins may be used alone or in a mixed state. To mix two or more thermoplastic resins together or to mix two or more thermosetting resins together is also a preferred embodiment from the standpoint of ease of molding.

To use a thermoplastic resin is a preferred embodiment among these from the standpoints of carbonization yield, moldability, and profitability. Suitable for use among those are poly(phenylene oxide), poly(vinyl alcohol), polyacrylonitrile, and wholly aromatic polyesters.

The eliminable resin is a resin to be eliminated after step 2, which will be described later, and is a resin which can be removed in any of the following stages: simultaneously with an infusibilizing treatment; after the infusibilizing treatment; and simultaneously with pyrolysis. Methods for removing the eliminable resin are not particularly limited. Suitable methods include: a method in which the eliminable resin is chemically removed, for example, by conducting depolymerization using a chemical; a method in which the eliminable resin is dissolved away by adding a solvent in which the eliminable resin dissolves; and a method in which the eliminable resin is removed by lowering the molecular weight thereof by thermal decomposition by heating. These techniques can be used alone or in combination. In the case of using a combination, the individual methods may be performed either simultaneously or separately.

As the method in which the resin is chemically removed, a method in which the resin is hydrolyzed using an acid or an alkali is preferred from the standpoints of profitability and handleability. Examples of resins which are susceptible to hydrolysis by acids or alkalis include polyesters, polycarbonates, and polyamides.

Suitable examples of the method in which the eliminable resin is removed by adding a solvent in which the eliminable resin dissolves include a method in which the solvent is continuously supplied to the carbonizable resin and eliminable resin that have been mixed with each other, thereby dissolving and removing the eliminable resin, and a method in which the solvent and the resins are mixed batchwise to dissolve and remove the eliminable resin.

Specific examples of the eliminable resin suitable for the method in which the resin is removed by adding a solvent include polyolefins such as polyethylene, polypropylene, and polystyrene, acrylic resins, methacrylic resins, polyvinylpyrrolidone, aliphatic polyesters, polycarbonates, and poly(vinyl alcohol). Among these, amorphous resins are preferred from the standpoint of solubility in the solvent. Examples thereof include polystyrene, methacrylic resins, polycarbonates, polyvinylpyrrolidone, and poly(vinyl alcohol).

Examples of the method in which the eliminable resin is removed by lowering the molecular weight thereof by thermal decomposition include: a method in which the carbonizable resin and eliminable resin that have been mixed with each other are heated batchwise, thereby performing thermal decomposition; and a method in which the carbonizable resin and eliminable resin that have been continuously mixed with each other are continuously supplied into a heating source and heated, thereby performing thermal decomposition.

The eliminable resin is preferably a resin, among those resins, which is eliminated by thermal decomposition when the carbonizable resin is carbonized by pyrolysis in step 3, which will be described later. It is preferable that the eliminable resin is a thermoplastic resin which does not undergo a large chemical change when the carbonizable resin is subjected to the infusibilizing treatment that will be described later and which results in a carbonization yield less than 10% after pyrolysis. Specific examples of such an eliminable resin include polyolefins such as polyethylene, polypropylene and polystyrene, acrylic resins, methacrylic resins, polyacetals, polyvinylpyrrolidone, aliphatic polyesters, aromatic polyesters, aliphatic polyamides, and polycarbonates. These resins may be used either alone or in a mixed state.

In step 1, the carbonizable resin and the eliminable resin are brought into a compatibly mixed state to obtain a resin mixture (polymer alloy). The expression "brought into a compatibly mixed state" herein means that a phase separation structure in which the carbonizable resin and the eliminable resin are present as separate phases is not observed with an optical microscope is produced by suitably selecting conditions concerning temperature and/or solvent.

The carbonizable resin and the eliminable resin may be brought into a compatibly mixed state by mixing only the resins with each other, or may be brought into a compatibly mixed state by further adding a solvent thereto.

Examples of systems in which a plurality of resins come into a compatibly mixed state include: a system which shows a phase diagram of the upper critical solution temperature (UCST) type, in which the resins are in a phase-separated state at low temperatures but form a single phase at high temperatures; and a system which conversely shows a phase diagram of the lower critical solution temperature (LCST) type, in which the resins are in a phase-separated state at high temperatures but form a single phase at low temperatures. Furthermore, particularly in the case of a system in which at least one of the carbonizable resin and the eliminable resin has been dissolved in a solvent, suitable examples thereof include a system in which the phase separation that will be described later is induced by infiltration of a nonsolvent.

The solvent to be added is not particularly limited. It is, however, preferable that the absolute value of the difference between the solubility parameter (SP value) of the solvent and the average of the SP values of the carbonizable resin and eliminable resin, which is an index to solubility, is 5.0 or less. It is known that the smaller the absolute value of the difference from the average of the SP values, the higher the solubility. It is hence preferable that the difference is zero. Meanwhile, the larger the absolute value of the difference from the average of the SP values, the lower the solubility and the more it is difficult to attain the compatibly mixed state of the carbonizable resin and eliminable resin. In view of this, the absolute value of the difference from the average of the SP values is preferably 3.0 or less, most preferably 2.0 or less.

Specific examples of compatibly mixable combinations of a carbonizable resin and an eliminable resin, in the case where the system contains no solvent, include poly(phenylene oxide)/polystyrene, poly(phenylene oxide)/styrene-acrylonitrile copolymer, wholly aromatic polyester/poly(ethylene terephthalate), wholly aromatic polyester/poly(ethylene naphthalate), and wholly aromatic polyester/polycarbonate. Specific examples of the combinations, in the case where the system contains a solvent, include polyacrylonitrile/poly(vinyl alcohol), polyacrylonitrile/polyvinylphenol, polyacrylonitrile/polyvinylpyrrolidone, polyacrylonitrile/poly(lactic acid), poly(vinyl alcohol)/vinyl acetate-vinyl alcohol copolymer, poly(vinyl alcohol)/poly(ethylene glycol), poly(vinyl alcohol)/poly(propylene glycol), and poly(vinyl alcohol)/starch.

Methods for mixing the carbonizable resin with the eliminable resin are not limited, and various known mixing techniques can be employed so long as the resins can be evenly mixed. Specific examples thereof include a rotary mixer having stirring blades and a kneading extruder with screws.

In a preferred embodiment, the temperature (mixing temperature) at which the carbonizable resin and the eliminable resin are mixed together is set at a temperature not lower than a temperature at which both the carbonizable resin and the eliminable resin soften. The temperature at which the resins soften may be suitably selected so that in the case where the carbonizable resin or the eliminable resin is a crystalline polymer, the melting point thereof is selected and in the case where the carbonizable resin or eliminable resin is an amorphous resin, the glass transition temperature thereof is selected. In cases when the mixing temperature is not lower than a temperature at which both the carbonizable resin and the eliminable resin soften, the two resins can have reduced viscosity and, hence, more efficient stirring and mixing are possible. Although there is no particular upper limit on the mixing temperature, the temperature is preferably 400° C. or lower from the standpoint of preventing resin deterioration due to thermal degradation, thereby obtaining a precursor for the porous carbon material which has excellent quality.

In step 1, 10-90% by weight of the carbonizable resin is mixed with 90-10% by weight of the eliminable resin. Since the proportions of the carbonizable resin and eliminable resin are within those ranges, an optimal pore size and an optimal porosity can be designed at will. Such proportions are hence preferred. So long as the proportion of the carbonizable resin is 10% by weight or higher, not only it is possible to obtain a carbonized material which retains mechanical strength but also an improvement in yield is attained; the proportion is hence preferred. Meanwhile, so long as the proportion of the carbonizable resin is 90% by weight or less, the eliminable resin can efficiently form voids; the proportion is hence preferred.

A mixing ratio between the carbonizable resin and the eliminable resin can be selected at will within the range shown above, while taking account of the compatibility of each material. Specifically, since compatibility between resins generally becomes worse as the ratio therebetween approaches 1:1, when a system which is not so high in the compatibility is selected as a raw material, it is also a preferred embodiment that the compatibility is improved by making the mixture close to a so-called partial composition by increasing or decreasing the amount of the carbonizable resin.

Also, it is also a preferred embodiment that a solvent is added when the carbonizable resin and the eliminable resin are mixed. The addition of the solvent not only lowers the viscosity of the carbonizable resin and the eliminable resin to facilitate molding but also makes the carbonizable resin and the eliminable resin easy to be brought into the compatibly mixed state. The solvent as referred to herein is also not particularly limited, and it may be any so long as it can dissolve or swell at least one of the carbonizable resin and the eliminable resin and is liquid at ordinary temperature. The case where the solvent dissolves both the carbonizable resin and the eliminable resin is a more preferred embodiment, because it becomes possible to improve the compatibility between both.

The amount of the solvent to be added is preferably 20% by weight or more based on the total amount of the carbonizable resin and the eliminable resin, from the stand point of improving the compatibility between the carbonizable resin and the eliminable resin and lowering the viscosity thereof to improve the fluidity. On the other hand, from the standpoint of cost associated with recovery and reuse of the solvent, it is preferably 90% by weight or less based on the total amount of the carbonizable resin and the eliminable resin.

[Step 2]

Step 2 is a step in which the resin mixture that has been brought into a compatibly mixed state in step 1 is caused to undergo phase separation to form a microstructure, and the microstructure is fixed.

Methods for causing the carbonizable resin and eliminable resin which have been mixed together to undergo phase separation are not particularly limited. Examples thereof include a heat-induced phase separation method in which phase separation is induced by a temperature change, a non-solvent-induced phase separation method in which phase separation is induced by adding a nonsolvent, a reaction-induced phase separation method in which phase separation is induced using a chemical reaction, and a method in which phase separation is caused by utilizing a change in light, pressure, shear, electric field, or magnetic field. Of these, the heat-induced phase separation method and the nonsolvent-induced phase separation method are preferred because the conditions for inducing phase separation are easy to control and it is hence relatively easy to control the phase separation structure and the size thereof.

These phase separation methods can be used alone or in combination. Specific examples of procedures in the case of using a combination of phase separation methods include: a method in which the mixture is passed through a coagulating bath to cause nonsolvent-induced phase separation and is then heated to cause heat-induced phase separation; a method in which nonsolvent-induced phase separation and heat-induced phase separation are simultaneously caused by controlling the temperature of a coagulating bath; and a method in which the material ejected from a spinneret is cooled to cause heat-induced phase separation and is then brought into contact with a nonsolvent.

In a preferred embodiment, the phase separation is not accompanied with any chemical reaction. The expression "not accompanied with any chemical reaction" means that the carbonizable resin or eliminable resin which has been mixed does not change in primary structure through the phase separation. The term "primary structure" means the chemical structure which constitutes the carbonizable resin or eliminable resin. In cases when the phase separation is not accompanied with any chemical reaction, the mechanical and chemical properties of the carbonizable resin and/or eliminable resin are not impaired and, hence, any desired structural body in the shape of a fiber, film, etc. can be molded without necessitating a considerable change of the molding conditions. This embodiment is hence preferred. In the case where the mixture is caused to undergo phase separation to form a microstructure without causing, in particular, a crosslinking reaction or the like and the microstructure is fixed, the large increase in elastic modulus and the decrease in elongation which are due to crosslinking are not observed and a flexible structure can be maintained during molding. Consequently, the molding of the resultant precursor does not result in fiber breakage or film breakage, and the fibers or film shows excellent processability.

[Step 3]

Step 3 is a step in which the precursor having a microstructure formed by phase separation in step 2 is stretched. This step makes it possible to orient, in the stretching direction, the phase separation structure formed in step 2. By further subjecting the stretched precursor to pyrolysis, an oriented porous carbon material in which the branch portions of the continuous porous structure have an aspect ratio of 3 or higher can be obtained.

The stretching can be performed by suitably using conventionally known techniques. Representative examples thereof include a method in which the precursor is stretched between rollers that differ in speed. Examples of this method include: a method in which the rollers themselves are heated to stretch the precursor; and a method in which a contact type or non-contact type heater, a warm water or solvent bath, a steam heater, a laser heater, or the like is disposed between the rollers to heat and stretch the precursor fibers.

It is also preferred to conduct press molding for the purpose of producing the same effect as the stretching. Another preferred method is to stretch the precursor while continuously pressing the precursor using a mold to restrict the direction in order to orient the precursor along a specific direction. Either of these stretching methods may be selected, or these methods may be used in combination. For example, the precursor which has been stretched between rollers may be sandwiched and pressed between rollers.

It is preferable that the heating temperature is not lower than the glass transition temperature(s) of the carbonizable resin and/or the eliminable resin, from the standpoint of ensuring molecular mobility to smoothly perform the stretching. By heating the precursor to a temperature not lower than the higher of the glass transition temperatures of the carbonizable resin and eliminable resin, both the carbonizable resin and the eliminable resin can be smoothly stretched. There is no particular upper limit on the heating temperature. However, in the case where the carbonizable resin or the eliminable resin is a crystalline polymer, it is preferable that the heating temperature is not higher than the melting point thereof. In the case where the carbonizable resin or the eliminable resin is an amorphous polymer, it is preferable that the heating temperature is 300° C. or lower from the standpoint of preventing carbonization reaction.

The stretching may be performed at a time up to a stretch ratio close to a critical stretch ratio where breakage occurs. However, from the standpoint of obtaining a more highly oriented precursor, it is preferred to perform the stretching in a plurality of stages. Since polymer chains have a molecular-weight distribution, there are often cases where polymer chains are a mixture of a component which relaxes in a short time and a component which relaxes in a longer time. It is hence preferable that the component which can relax in a short time is stretched first in a high stretch ratio. The term "high stretch ratio" herein means that an S-S curve of the unstretched precursor is acquired beforehand and a stretch ratio is set at a value not less than 90% of a stretch ratio calculated from the elongation measured at a secondary yield point appearing after a low-stress elongation region. In cases when the precursor is stretched at a ratio not less than 90% of the stretch ratio calculated from the secondary-yield-point elongation, an even material free from thickness unevenness and having excellent quality is obtained. With respect to subsequent stretching, it is preferred to determine a stretch ratio while taking account of the degree of orientation, strength, and elongation of the final precursor. However, use can be made of a method in which a stretch ratio less than 2 is set as an aim and stretching in this stretch ratio is conducted multiple times, thereby stably obtaining a highly oriented precursor while preventing the material from breaking.

There is no particular lower limit on the stretch ratio. However, stretch ratios not less than a ratio in which stretching tension occurs during the stretching are preferred since the material shows excellent processability and can be efficiently stretched. The term "ratio in which stretching tension occurs" herein means a minimum ratio in which the precursor according to the present invention that is being stretched is under tension and is not in a relaxed state. For example, in the case where the precursor is one which shrinks during the stretching step, tension generates due to shrinkage stress and, hence, a stretch ratio less than 1 can be used.

[Heat Treatment Step]

It is preferable that the precursor which has been stretched in step 3 is further subjected to a heat treatment step. The heat treatment suppresses the shrinkage caused by the relaxation of the molecular chains oriented by the stretching, and the precursor is hence rendered capable of being subjected to carbonization while maintaining the highly oriented state.

With respect to specific methods for the heat treatment, conventionally known techniques can be used. In the case of performing the heat treatment batchwise, a preferred method is to heat the precursor which has been wound up, in an oven or the like. In the case of performing the heat treatment in the line, it is preferred to use: a method in which a roller surface itself is heated; or a method in which a contact type or non-contact type heater, a warm water or solvent bath, a steam heater, a laser heater, or the like is disposed between rollers to conduct the heat treatment.

It is preferable that the heating temperature in the heat treatment is not lower than the glass transition temperature (s) of the carbonizable resin and/or the eliminable resin, from the standpoint of ensuring molecular mobility to smoothly perform the relaxation of the molecular chains and from the standpoint of inducing crystallization to greatly improve dimensional stability especially in the case where the carbonizable resin and/or the eliminable resin is a crystalline polymer. In a more preferred embodiment, the precursor is heated especially to a temperature not lower than the higher of the glass transition temperatures of the carbonizable resin and eliminable resin, because the molecular mobility of the carbonizable resin and eliminable resin can be ensured to smoothly perform the relaxation of the molecular chains.

There is no particular upper limit on the heating temperature in the heat treatment. However, in the case where the carbonizable resin or the eliminable resin is a crystalline polymer, it is preferable that the heating temperature is not higher than the melting point thereof. In the case where the carbonizable resin or the eliminable resin is an amorphous polymer, it is preferable that the heating temperature is 300° C. or lower, from the standpoint of avoiding carbonization reaction.

The heat treatment is intended to crystallize or relax the oriented state of the molecular chains to prevent macroscopic shrinkage. It is therefore preferable that the precursor during the heat treatment is restricted so that the length thereof changes only in the range of 0.8-1.2 times. The expression "be restricted in length" means that the dimensional change in the heat treatment is suppressed. Specifically, examples of methods include: to wind the precursor on a metallic roll; to restrict the length using clips; to restrict the length by pinning; to fix the precursor to a metal frame; and to heat-treat the precursor which is running at a controlled speed between rollers. In the precursor which has been heat-treated, the orientation has partly relaxed and, in the case where the resin mixture contained a crystalline polymer, crystallization has proceeded. It is hence possible to prevent macroscopic shrinkage, and the molecular chains which have been oriented in the stretching step can be fixed. With respect to the restriction in length, lengths not less than 0.8 times are preferred because microscopic molecular chains can mainly be considerably relaxed while minimizing relaxation of the structure in which the phase-separated state has been oriented. Meanwhile, lengths not larger than 1.2 times are preferred because microscopic molecular chains can mainly be relaxed while highly maintaining the oriented phase-separated state without causing relaxation thereof.

[Removal of the Eliminable Resin]

It is preferable that before the precursor which has been stretched in step 3 is subjected to the carbonization step (step 4), the eliminable resin is removed. Methods for removing the eliminable resin are not particularly limited, and any method capable of decomposing or removing the eliminable resin may be used. Specifically, suitable methods include: a method in which the eliminable resin is chemically decomposed and reduced in molecular weight using an acid, an alkali, or an enzyme to remove the resin; a method in which a solvent in which the eliminable resin dissolves is added to dissolve away the resin; and a method in which the eliminable resin is depolymerized using radiation such as electron beams, gamma rays, ultraviolet rays, or infrared rays to thereby remove the resin.

In particular, when the eliminable resin can be removed by thermal decomposition, heat treatment can be previously performed at a temperature at which 80% by weight or more of the eliminable resin is eliminated, and the eliminable resin can also be removed by thermal decomposition and gasification in the carbonization step (step 4) or infusibilizing treatment described later. From the standpoint of decreasing the number of steps to enhance the productivity, it is a more preferred embodiment to select the method of removing the eliminable resin by the thermal decomposition and gasification simultaneously with heat treatment in the carbonization step (step 4) or the infusibilizing treatment described later. An especially preferred embodiment among these is to remove the eliminable resin simultaneously with the carbonization in the carbonization step (step 4), because not only a cost reduction due to the reduction in the number of steps but also an improvement in yield are expected.

[Pulverization Treatment]

It is also preferable that the precursor which has been stretched in step 3 is pulverized into particles in a pulverization treatment before being subjected to the carbonization step (step 4). In this case, the pulverization as step 5 is unnecessary. The pulverization treatment can be conducted by the same method as in step 5, which will be described later.

[Infusibilizing Treatment]

It is preferable that the precursor which has been stretched in step 3 or the material obtained by subjecting the stretched precursor to the treatment for removing the eliminable resin according to need is subjected to an infusibilizing treatment before being subjected to the carbonization treatment (step 4). Methods for the infusibilizing treatment are not particularly limited, and known methods can be used. Specific examples thereof include a method in which the precursor or the treated precursor is heated in the presence of oxygen to thereby cause oxidative crosslinking, a method in which the precursor or the treated precursor is irradiated with high-energy rays such as electron beams or gamma rays to form a crosslinked structure, and a method in which a substance having a reactive group is infiltrated into or mixed with the precursor or treated precursor to form a crosslinked structure. Preferred of these is the method in which the precursor or the treated precursor is heated in the presence of oxygen to thereby cause oxidative crosslinking, because the process is simple and the production cost can be reduced. These techniques may be used alone or in combination, and two or more thereof may be used either simultaneously or separately.

The heating temperature in the method in which the precursor or the treated precursor is heated in the presence of oxygen to thereby cause oxidative crosslinking is preferably a temperature of 150° C. or higher from the standpoint of allowing the crosslinking reaction to proceed efficiently. Meanwhile, the heating temperature is preferably a temperature of 350° C. or lower from the standpoint of preventing the deterioration of yield caused by a weight loss due to the thermal degradation, combustion or the like of the carbonizable resin.

The oxygen concentration during the treatment is not particularly limited. However, a preferred embodiment is one in which a gas having an oxygen concentration of 18% or higher, in particular, air as such, is supplied, because the production cost can be reduced. Methods for supplying the gas are not particularly limited, and examples thereof include a method in which air is supplied as it is to the heating device and a method in which pure oxygen is supplied to the heating device using a bomb or the like.

Examples of the method in which the precursor or the treated precursor is irradiated with high-energy rays such as electron beams or gamma rays to form a crosslinked structure include a method in which the carbonizable resin is irradiated with electron beams, gamma rays, or the like using a commercial electron beam generator, gamma ray generator, or the like to thereby induce crosslinking. A lower limit of the irradiation intensity is preferably 1 kGy or more from the standpoint of efficient introduction of a crosslinked structure by the irradiation. From the standpoint of preventing the material strength from being reduced by a decrease in molecular weight due to scission of the main chain, the irradiation intensity is preferably 1,000 kGy or less.

It is preferable that a crosslinking compound having one or more carbon-carbon double bonds in the structure thereof is also used during the irradiation. As the crosslinking compound, any desired known such compound can be used. Examples thereof include ethylene, propene, isoprene, butadiene, styrene, α-methylstyrene, divinylbenzene, acrylic acid, methacrylic acid, monoallyl isocyanurate, diallyl isocyanurate, and triallyl isocyanurate. However, a crosslinking compound having two or more carbon-carbon double bonds in the molecule thereof is preferred because the crosslinking reaction can be efficiently conducted.

Examples of the method in which a substance having a reactive group is infiltrated into or mixed with the precursor or treated precursor to form a crosslinked structure include: a method in which a low-molecular-weight compound having a reactive group is infiltrated into the precursor or the treated precursor, followed by heating or irradiating with high-energy rays to allow a crosslinking reaction to proceed; and a method in which a low-molecular-weight compound having a reactive group is mixed in advance, and the mixture is heated or irradiated with high-energy rays to allow a crosslinking reaction to proceed.

To conduct a decomposition treatment simultaneously with the infusibilizing treatment is also preferred because a cost reduction due to a decrease in the number of steps can be expected.

[Step 4]

Step 4 is a step in which the precursor itself which has been stretched in step 3 or the precursor which has undergone the decomposition treatment and/or the infusibilizing treatment according to need is subjected to pyrolysis and carbonized to obtain a porous carbon material.

It is preferred to perform the pyrolysis by heating the precursor at 500° C. or higher in an inert gas atmosphere in order to sufficiently carbonize the precursor. The term "inert gas" herein means a gas which is chemically inert during the heating. Specific examples thereof include helium, neon, nitrogen, argon, krypton, xenon, and carbon dioxide. In a preferred embodiment, nitrogen or argon is used among these from the standpoint of profitability. Especially in the case where the carbonization temperature is 1,500° C. or higher, it is preferred to use a rare gas element such as argon, helium, neon, krypton, or xenon, from the standpoint of inhibiting the formation of nitrides. From the standpoint of cost, it is preferred to use argon among these.

Carbonization temperatures of 500° C. and higher are preferred because a network of carbon is efficiently formed throughout the whole porous carbon material which includes branch portions constituting a continuous porous structure. The lower the carbonization temperature, the more the carbon network is disordered. Meanwhile, the higher the carbonization temperature, the less the carbon network is disordered. It is hence preferred to suitably select a carbonization temperature in accordance with the desired degree of order of the carbon network. The term "carbonization temperature" in the present invention means a maximum temperature which is reached in the carbonization treatment in step 4, and that term is not intended to restrict a treatment performed at a lower temperature.

The flow rate of the inert gas may be any rate which can sufficiently reduce the oxygen concentration in the heating device, and it is preferred to suitably select an optimal value in accordance with the size of the heating device, amount of the raw material supplied, heating temperature, etc. There is no particular upper limit on the flow rate, and it is preferred to suitably set the flow rate in accordance with a temperature distribution and the design of the heating device, from the standpoints of profitability and diminishing temperature changes within the heating device. In an embodiment, the gas which evolves during the carbonization can be sufficiently removed from the system. This embodiment is more preferred because a porous carbon material having excellent quality can be obtained. It is hence preferred to determine the flow rate of the inert gas so that the concentration of the evolved gas in the system is 3,000 ppm or less.

There is no upper limit on the carbonization temperature. However, carbonization temperatures not higher than 3,000° C. are preferred from the standpoint that carbonization can proceed sufficiently.

With respect to methods for heating in the case of continuously performing the carbonization treatment, a method in which the material is continuously supplied to and taken out from a heating device kept at a constant temperature, using rollers, a conveyor, a rotary kiln, or the like is preferred because the production efficiency can be heightened. Furthermore, a method in which when heating the material during the heating for carbonization treatment, the material is heated while being mixed is also suitable from the standpoint of evenly performing the heat treatment to heighten the quality of the material. In the case where it is difficult to mix the material itself, such as fibers or a film, it is preferred to contrive so that the inert gas stream is evenly blown against the whole material, because this is effective for even heat treatment and higher quality.

Meanwhile, in the case of performing a batch treatment in a heating device, there are no particular lower limits on the temperature rising rate and temperature dropping rate. However, the rates are preferably 1° C./min or higher because the time period required for the temperature rising and temperature dropping can be shortened to thereby heighten the production efficiency. Meanwhile, there are no particular upper limits on the temperature rising rate and temperature dropping rate, but it is preferred to regulate the rates so as to be less than the thermal shock resistance of the material constituting the heating device.

The time period during which the material is held at the carbonization temperature can be set at will. The longer the holding period, the more the disorder of the carbon material can be reduced. The shorter the holding period, the more the disorder of the carbon network can be enhanced. It is therefore preferred to suitably set the holding period in accordance with intended applications. However, holding periods not shorter than 5 minutes are preferred because the disorder of the carbon network can be efficiently reduced. Meanwhile, to regulate the holding period so as to be up to 1,200 minutes at the most is preferred because the porous carbon material of the present invention is efficiently obtained while reducing energy consumption.

[Step 5]

Step 5 is a step in which the porous carbon material obtained in step 4 is pulverized. By pulverizing the porous carbon material obtained in step 4, a particulate porous carbon material can be produced.

For the pulverization treatment, a conventionally known method can be selected. It is preferred to suitably select a pulverization method in accordance with the particle size resulting from the pulverization treatment and with throughput. Examples of pulverization methods include a ball mill, bead mill, and jet mill. In the case where the precursor is fibers, it is also preferred to conduct rough pulverization in which the fiber length is reduced beforehand using a cutter or the like. Although the pulverization treatment may be continuous or batchwise, a continuous treatment is preferred from the standpoint of production efficiency. The grinding medium to be contained in the ball mill is suitably selected. However, for applications where inclusion of metallic materials is undesirable, it is preferred to use a grinding medium made of a metal oxide, such as alumina, zirconia, or titania, or a grinding medium obtained by coating cores made of stainless steel, iron, or the like with a nylon, polyolefin, fluorinated polyolefin, etc. For other applications, use of a metal such as stainless steel, nickel, or iron is suitable.

A pulverization aid may be used during the pulverization, and this is a preferred embodiment from the standpoint of heightening the efficiency of pulverization. The pulverization aid is selected at will from among water, alcohols, glycols, ketones, etc. Preferred alcohols are ethanol and methanol from the standpoints of availability and cost. Preferred, in the case of glycols, are ethylene glycol, diethylene glycol, propylene glycol, and the like. Preferred, in the case of ketones, are acetone, ethyl methyl ketone, diethyl ketone, and the like. It is preferable that the pulverization aid is removed after the pulverization by performing washing and drying. In the case where the efficiency of pulverization decreases due to heat generation which accompanies the pulverization treatment, it is preferred to cool the equipment. Although methods for the cooling are not particularly limited, examples thereof include to use cooling wind or cold water. Preferred of these is to cool with cold water, from the standpoint of the efficiency of heat exchange.

It is preferable that the particulate porous carbon material obtained through the pulverization treatment is classified to obtain a material having an even particle size. The particulate porous carbon material having an even particle size, when used, for example, as a filler or an additive for pastes, can form an even structure, making it possible to stabilize the efficiency of filling and the paste application step. Such particulate porous carbon material is hence preferred because the production efficiency is heightened and a cost reduction can be expected. With respect to particle size, it is preferred to suitably select a particle size in accordance with applications of the particulate porous carbon material which has undergone the pulverization treatment.

As stated hereinabove, step 5 is unnecessary in the case where a pulverization treatment is performed before step 4.

EXAMPLES

Preferred examples of the present invention are described below, but the examples described below should not be construed as limiting the present invention.

Evaluation Methods

[Continuous Porous Structure]

A particulate porous carbon material was placed on a specimen stage for a scanning electron microscope and examined. A secondary-electron image was obtained by scanning the specimen surface at an accelerating voltage of 1 kV and a current value of 10 µA. In the case where it was observed that pores and branch portions were continuously intertwined with each other along the viewing direction in the specimen being examined, this specimen was deemed to have a continuous porous structure.

[Structural Period of Continuous Porous Structure]

A particulate porous carbon material was sandwiched between specimen plates, and the positions of a CuKα line source, the specimen, and a two-dimensional detector were regulated so that information on scattering angles less than 10 degrees was obtained from the X-ray obtained from the CuKα line source. From the image data (brightness information) obtained from the two-dimensional detector, a central part affected by the beam stopper was removed. A radius vector from the beam center was determined, and the brightness values measured over 360° at angle intervals of 1° were summed up to obtain a scattering intensity distribution curve. From the scattering angle 2θ corresponding to the position where the curve obtained had a peak, the structural period of the continuous porous structure was obtained using the following equation.

$$L = \frac{\lambda}{2 \sin \theta}$$ [Math. 2]

Structural Period: L
λ: Wavelength of Incident X-Rays

[Average Porosity]

As in the "Aspect ratio, number of aggregated branch portions (N), and ratio of the number of aggregated branch portions (N) to the number of joints (n)" which will be described later, an image was obtained by examining a cross-section of a particulate porous carbon material obtained by an ion-beam continuous-section method, with a scanning secondary-electron microscope at a magnification for the material center of 1±0.1 (nm/pixel) and at a resolution of 700,000 pixels or higher. An observation region necessary for calculation and having a size of 512-pixel square was set on the image, and the average porosity was calculated using the following equation, in which A is the area of the observation region and B is the area of the pores.

Average porosity (%)=B/A×100

[Acquisition of Pore Diameter Distribution Curve]

A particulate porous carbon material was vacuum-dried under the conditions of 300° C. and 5 hours to thereby remove the adsorbed gases. Thereafter, AutoPore IV9500, manufactured by Shimadzu Corp., was used to acquire a pore diameter distribution curve.

[Aspect Ratio, Number of Aggregated Branch Portions (N), and Ratio of the Number of Aggregated Branch Portions (N) to the Number of Joints (n)]

A three-dimensional image of a particulate porous carbon material was obtained by the ion-beam continuous-section method. The three-dimensional image obtained was subjected to axis thinning using Amira, manufactured by FEI Co., to obtain line data and the number of joints. With respect to each of branch portions extracted from the axis thinning data obtained, the line route corresponding to one joint of the branch portion to the other joint was divided into ten segments, and a perpendicular was drawn from the center X of each of the route segments within the three-dimensional image to the branch portion surface. The distance R(X) to the point where this perpendicular met the void was calculated. This R(X) was determined as an average value by scanning over 360° the perpendiculars drawn from the line as the center at intervals of 10°/step.

Here, the aspect ratio (L/D) was calculated using $D=2R_{min}$, which was calculated from $R_{min}$, which was the minimum value of R(X), and using the distance L, which was the total joint-to-joint distance used for calculating R(X). This analysis for aspect ratio (L/D) was conducted with respect to ten branch portions, and an average thereof was taken as the aspect ratio.

Furthermore, the number of the branch portions (N) contained in the three-dimensional image and the number of the joints (n) contained therein were counted, and the value of N was taken as the number of aggregated branch portions. In addition, the ratio of the N to the number of joints (n), N/n, was calculated.

[Average Particle Diameter]

A particulate porous carbon material was placed on an examination stage for an electron microscope, and five portions were photographed at such a magnification that ten or more particles were separately recognizable. Ten particles were extracted from each of the photographs, and the area of each particle was determined. From the area, the particle diameter was determined in terms of the diameter of a circle having the same area. This operation was performed with respect to the 50 particles extracted, and an average thereof was taken as the average particle diameter.

Example 1

Into a separable flask were charged 37.5 g of polyacrylonitrile (MW: 150,000) manufactured by Polyscience, Inc., 37.5 g of polyvinylpyrrolidone (MW: 40,000) manufactured by Sigma-Aldrich Co., and 425 g of dimethyl sulfoxide (DMSO) manufactured by Wakenyaku Co., Ltd., as a solvent. The mixture was heated at 150° C. for 3 hours with stirring and refluxing to prepare a uniform and transparent solution. In this solution, the concentrations of the polyacrylonitrile and the polyvinylpyrrolidone were 7.5% by weight each.

The DMSO solution obtained was cooled to 25° C., subsequently ejected at a rate of 3 mL/min from a one-orifice spinneret having an orifice diameter of 0.6 mm, and introduced into a pure-water coagulating bath kept at 25° C. Thereafter, the resultant filament was taken up at a rate of 6 m/min and accumulated on a vat to thereby obtain a raw fiber. In the above operation, the air gap was set at 3 mm, and the immersion length in the coagulating bath was 15 cm. The raw fiber obtained was translucent and had undergone phase separation.

The raw fiber obtained was dried for 1 hour in a circulating drying machine kept at 25° C., thereby removing the water present on the surface of the raw fiber, and then vacuum-dried at 25° C. for 5 hours to obtain a dried raw fiber as a precursor material.

The raw fiber obtained was stretched at a stretch ratio of 4 in a heater kept at 120° C. and having a slit width of 10 mm and a slit length of 30 cm.

Thereafter, the raw fiber wound on a frame made of stainless steel was introduced, as a precursor, into an electric furnace kept at 235° C. and was heated in an oxygen atmosphere for 1 hour to thereby perform an infusibilizing treatment. The raw fiber turned black through the infusibilizing treatment.

The infusibilized raw fiber obtained was fixed to a frame made of carbon and subjected to a carbonization treatment under the conditions of a nitrogen flow rate of 1 L/min, temperature rising rate of 10° C./min, maximum temperature of 900° C., and holding period of 10 minutes, thereby obtaining a porous carbon fiber.

The porous carbon fiber obtained was roughly pulverized using a mortar and then pulverized with a ball mill for 2 hours. In the pulverization product obtained, the continuous porous structure shown in FIG. 2 was observed. This continuous porous structure had a structural period of 0.086 μm and an average porosity of 55%. The average particle diameter was 10 μm. Three particles each having a size close to the average particle diameter were extracted from the pulverization product and examined or analyzed for structure. As a result, it was found that the branch portions had an aspect ratio of 6.1 and that the number of aggregated branch portions N was 262, the number of joints n was 80, and the value of N/n was 3.3. The pulverization product obtained was excellent in terms of electrical conductivity and thermal conductivity and further had excellent resistance to compression.

Example 2

A porous carbon fiber and a product of pulverization thereof were obtained in the same manner as in Example 1, except that the stretch ratio was changed to 2.0. The pulverization product obtained had a structural period of 0.085 μm and an average porosity of 54%, and had an average particle diameter of 7 μm. The branch portions thereof had an aspect ratio of 4.2, the number of aggregated branch portions N was 204, and the number of joints n was 52. The value of N/n was 3.9. The pulverization product obtained was excellent in terms of electrical conductivity and thermal conductivity and further had excellent resistance to compression.

Example 3

A porous carbon fiber and a product of pulverization thereof were obtained in the same manner as in Example 1, except that the pulverization was performed for 4 hours. The pulverization product obtained had a structural period of 0.087 μm and an average porosity of 55%, and had an average particle diameter of 3 μm. The branch portions thereof had an aspect ratio of 5.9, the number of aggregated branch portions N was 104, and the number of joints n was 61. The value of N/n was 1.7. The pulverization product obtained was excellent in terms of electrical conductivity and thermal conductivity and further had excellent resistance to compression.

Example 4

A porous carbon fiber and a product of pulverization thereof were obtained in the same manner as in Example 1, except that the pulverization was performed for 10 hours. The pulverization product obtained had a structural period of 0.087 μm and an average porosity of 55%, and had an average particle diameter of 1 μm. The branch portions thereof had an aspect ratio of 6.3, the number of aggregated branch portions N was 35, and the number of joints n was 27. The value of N/n was 1.3. The pulverization product obtained was excellent in terms of electrical conductivity and thermal conductivity and further had excellent resistance to compression.

Comparative Example 1

A hundred parts by weight of a mixture of 60% by weight of acrylonitrile (hereinafter abbreviated to AN) copolymer configured of 98% by mole of AN and 2% by mole of methacrylic acid (hereinafter abbreviated to MAA) and 40% by weight of thermally-decomposable copolymer configured of 99% by mole of methyl acrylate (hereinafter abbreviated to MMA) and 1% by mole of methyl acrylate (hereinafter abbreviated to MA) was mixed with 5 parts by weight of a compatibilizing agent constituted of a block copolymer configured of 40% by mole of AN and 60% by mole of MMA. This mixture was dissolved in dimethylformamide (hereinafter abbreviated to DMF) as a solvent so that the concentration of the three-copolymer mixture in the solution became 26% by weight. Thus, a mixture solution was obtained.

This mixture solution was extruded from a nozzle to conduct spinning by a dry-wet spinning method to obtain a fiber, and this fiber was stretched 2 times in warm water and further stretched 2 times in hot water. Thereafter, the fiber was stretched 1.5 times between heated rolls, resulting in a total stretch ratio of 6. The fiber obtained was continuously treated in a 250° C. flameproofing furnace and then continuously treated in a 600° C. pyrolysis furnace to obtain a carbon fiber. The carbon fiber obtained was crushed, and the structure thereof was examined. As a result, the product of crushing was found to be a mass of carbon fiber fibrils, and no branch portions were observed in the fibrils. The product of crushing obtained was poor in electrical conductivity and thermal conductivity, and the shape thereof was easily broken by compression.

The invention claimed is:

1. A particulate porous carbon material having a continuous porous structure, the particulate porous carbon material satisfying the following A to C:
   A: branch portions forming the continuous porous structure have an aspect ratio of 3 or higher;
   B: the branch portions have aggregated through joints interposed therebetween, the number of the aggregated branch portions (N) being 3 or larger;
   C: a ratio of the number of the aggregated branch portions (N) to the number of the joints (n), N/n, is 1.2 or larger, and
   wherein the continuous porous structure has a structural period of 0.002 μm-10 μm.

2. The particulate porous carbon material according to claim 1, wherein the continuous porous structure has an average porosity of 10-80%.

3. The particulate porous carbon material according to claim 1, wherein the continuous porous structure has an average porosity of 10-80%.

4. The particulate porous carbon material according to claim 1, wherein the N/n is 1.5 or larger.

5. The particulate porous carbon material according to claim 1, wherein the N/n is 1.5 or larger.

6. The particulate porous carbon material according to claim 2, wherein the N/n is 1.5 or larger.

7. The particulate porous carbon material according to claim 3, wherein the N/n is 1.5 or larger.

8. The particulate porous carbon material according to claim 1, which further has a portion having no continuous porous structure.

9. The particulate porous carbon material according to claim 1, which further has a portion having no continuous porous structure.

10. The particulate porous carbon material according to claim 4, which further has a portion having no continuous porous structure.

11. The particulate porous carbon material according to claim 1, which has a particle diameter of 10 nm to 10 μm.

12. The particulate porous carbon material according to claim 4, which has a particle diameter of 10 nm to 10 μm.

13. A particulate carbon material assembly comprising the particulate porous carbon material according to claim 1.

14. A particulate carbon material assembly comprising the particulate porous carbon material according to claim 4.

15. A process for producing a particulate porous carbon material according to claim 1, the process comprising the following steps in the following order:
- step 1: a step in which 10-90% by weight of a carbonizable resin and 90-10% by weight of an eliminable resin are brought into a compatibly mixed state to obtain a resin mixture;
- step 2: a step in which the resin mixture obtained in the step 1 is caused to undergo phase separation to form a microstructure, and the microstructure is fixed to obtain a precursor;
- step 3: a step in which the precursor obtained in the step 2 is stretched;
- step 4: a step in which the stretched precursor is carbonized to obtain a porous carbon material; and
- step 5: a step in which the porous carbon material obtained in the step 4 is pulverized;

wherein the eliminable resin is removed either between the step 3 and the step 4 or simultaneously with the step 4.

16. A process for producing a particulate porous carbon material according to claim 1, the process comprising the following steps in the following order:
- step 1: a step in which 10-90% by weight of a carbonizable resin and 90-10% by weight of an eliminable resin are brought into a compatibly mixed state to obtain a resin mixture;
- step 2: a step in which the resin mixture obtained in the step 1 is caused to undergo phase separation to form a microstructure, and the microstructure is fixed to obtain a precursor; and
- step 3: a step in which the precursor obtained in the step 2 is stretched, and thereafter further comprising:
- a step in which the stretched precursor is pulverized; and
- step 4: a step in which the pulverized precursor is carbonized, wherein the eliminable resin is removed either between the step 3 and the step 4 or simultaneously with the step 4.

* * * * *